(12) United States Patent
Laskaris et al.

(10) Patent No.: US 6,600,251 B2
(45) Date of Patent: Jul. 29, 2003

(54) SUPER-CONDUCTING ROTOR COIL WINDING SUPPORT ASSEMBLY METHOD FOR SYNCHRONOUS MACHINE

(75) Inventors: Evangelos Trifon Laskaris, Schenectady, NY (US); James Pellegrino Alexander, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/218,487

(22) Filed: Aug. 15, 2002

(65) Prior Publication Data

US 2002/0190586 A1 Dec. 19, 2002

Related U.S. Application Data

(62) Division of application No. 09/854,946, filed on May 15, 2001.

(51) Int. Cl.[7] ............... H02K 3/46; H02K 3/48; H02K 9/00; H02K 9/20; H02K 5/00
(52) U.S. Cl. ............ 310/270; 310/214; 310/54; 310/91; 310/66
(58) Field of Search ............... 310/54, 52, 91, 310/270, 214, 66, 40 R, 10

(56) References Cited

U.S. PATENT DOCUMENTS

| | | | | |
|---|---|---|---|---|
| 4,016,444 A | * | 4/1977 | Gillet | 310/261 |
| 4,462,152 A | * | 7/1984 | Okamoto et al. | 29/598 |
| 4,745,313 A | * | 5/1988 | Brunet et al. | 310/52 |
| 5,325,080 A | * | 6/1994 | Chandratilleke et al. | 335/216 |
| 5,404,122 A | * | 4/1995 | Maeda et al. | 335/216 |
| 5,519,274 A | * | 5/1996 | Scharrer | 310/90.5 |
| 5,532,663 A | | 7/1996 | Herd et al. | 335/216 |
| 5,548,168 A | | 8/1996 | Laskaris et al. | 310/52 |
| 5,672,921 A | | 9/1997 | Herd et al. | 310/52 |
| 5,774,032 A | | 6/1998 | Herd et al. | 335/216 |
| 5,777,420 A | | 7/1998 | Gamble et al. | 310/261 |
| 5,798,678 A | | 8/1998 | Manlief et al. | 335/216 |
| 5,880,547 A | * | 3/1999 | Shoykhet | 310/91 |
| 5,953,224 A | | 9/1999 | Gold et al. | 363/98 |
| 6,066,906 A | | 5/2000 | Kalsi | 310/179 |
| 6,140,719 A | | 10/2000 | Kalsi | 310/52 |
| 6,169,353 B1 | | 1/2001 | Driscoll et al. | 310/261 |
| 6,173,577 B1 | | 1/2001 | Gold | 62/51.1 |
| 6,313,556 B1 | * | 11/2001 | Dombrovski et al. | 310/91 |
| 6,429,563 B1 | * | 8/2002 | Rothman et al. | 310/149 |
| 6,495,942 B1 | * | 12/2002 | Kaminski et al. | 310/262 |

FOREIGN PATENT DOCUMENTS

| | | | | |
|---|---|---|---|---|
| EP | 1261105 A2 | * | 11/2002 | H02K/01/28 |
| EP | 1261116 A2 | * | 11/2002 | H02K/55/04 |

OTHER PUBLICATIONS

Fast, Reactive Power Support, *HTS Generators*, American Superconductor™ (Feb. 27, 2001)pp. 1–4.

* cited by examiner

Primary Examiner—Burton S. Mullins
Assistant Examiner—Pedro J. Cuevas
(74) Attorney, Agent, or Firm—Nixon & Vanderhye P.C.

(57) ABSTRACT

A rotor is disclosed for a synchronous machine comprising: a rotor core; a super-conducting coil winding extending around at least a portion of the rotor core, said coil winding having a side section adjacent a side of the rotor core; at least one tension rod extending through a conduit in said rotor core; at least one tension bolt extending between an end of the tension rod and abutting the side section of the coil winding; and a channel housing attached to the tension bolt and the coil winding.

7 Claims, 4 Drawing Sheets

SUPER-CONDUCTING ROTOR COIL WINDING SUPPORT ASSEMBLY METHOD FOR SYNCHRONOUS MACHINE

This is a division of application Ser. No. 09/854,946 filed May 15, 2001.

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001;

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conductive coil in a synchronous rotating machine. More particularly, the present invention relates to a support structure for super-conducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature. As a result, no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal forces that stress and strain the coil windings. Normal operation of electrical machines involves thousands of start-up and shut-down cycles over the course of several years that result in low cycle fatigue loading of the rotor. Furthermore, the HTS rotor winding should be capable of withstanding 25% over-speed operation during rotor balancing procedures at ambient temperature, and notwithstanding occasional over-speed conditions at cryogenic temperatures during power generation operation. These over-speed conditions substantially increase the centrifugal force loading on the windings over normal operating conditions.

SC coils used as the HTS rotor field winding of an electrical machine are subjected to stresses and strains during cool-down and normal operation. They are subjected to centrifugal loading, torque transmission, and transient fault conditions. To withstand the forces, stresses, strains and cyclical loading, the SC coils should be properly supported in the rotor by a coil support system. These support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy-to-fabricate components.

BRIEF SUMMARY OF THE INVENTION

A coil support system has been developed for a race-track shaped, high temperature super-conducting (HTS) coil winding for two-pole rotor of an electrical machine. The coil support system prevents damage to the coil winding during rotor operation, supports the coil winding with respect to centrifugal and other forces, and provides a protective shield for the coil winding. The coil support system holds the coil winding with respect to the rotor. The HTS coil winding and coil support system are at cryogenic temperature while the rotor is at ambient temperature.

The coil support system includes a series of coil support assemblies that span between opposite sides of the race-track coil winding. Each coil support assembly includes a tension rod, a pair of tension bolts and a pair of channel housings. The tension rods extend between opposite sides of the coil winding through conduits, e.g., holes, in the rotor core. Tension bolts are inserted into both ends of the tension rod. The tension bolts provide a length adjustment of the coil support assembly that is useful to compensate for variations in coil geometry. Each bolt is fastened to one of the pair of channel housings. Each housing fits around the HTS coil. Each coil support assembly braces the coil winding with respect to the rotor core. The series of coil support assemblies provides a solid and protective support for the coil winding.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system is useful in integrating the coil support system with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

In a first embodiment, the invention is a rotor for a synchronous machine comprising: a rotor core; a super-conducting coil winding extending around at least a portion of the rotor, said coil winding having a side section adjacent a side of the rotor core; at least one tension rod extending through a conduit in said rotor; at least one tension bolt is inserted into an end of the tension rod; and a housing attached to the tension bolt and bracketing the side section of the coil winding.

In another embodiment, the invention is a method for supporting a super-conducting coil winding in the rotor core of a synchronous machine comprising the steps of: extending a tension rod through a conduit in said rotor core; inserting at least one tension bolt into an end of the rod; positioning the coil winding around the rotor core such that the tension rod and tension bolt span between side sections of the coil winding; assembling at least one channel housing around one of the side sections of the coil winding, and securing the bolt to one of the channel housings.

A further embodiment of the invention is a rotor for a synchronous machine comprising: a rotor core having a conduit orthogonal to a longitudinal axis of the rotor; a race-track, super-conducting (SC) coil winding in a planar race-track parallel to the longitudinal axis of the rotor; a tension rod inside the conduit of the core; a tension bolt in each end of said tension rod, and a housing coupling opposite sides of the coil winding to the tension bolts.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
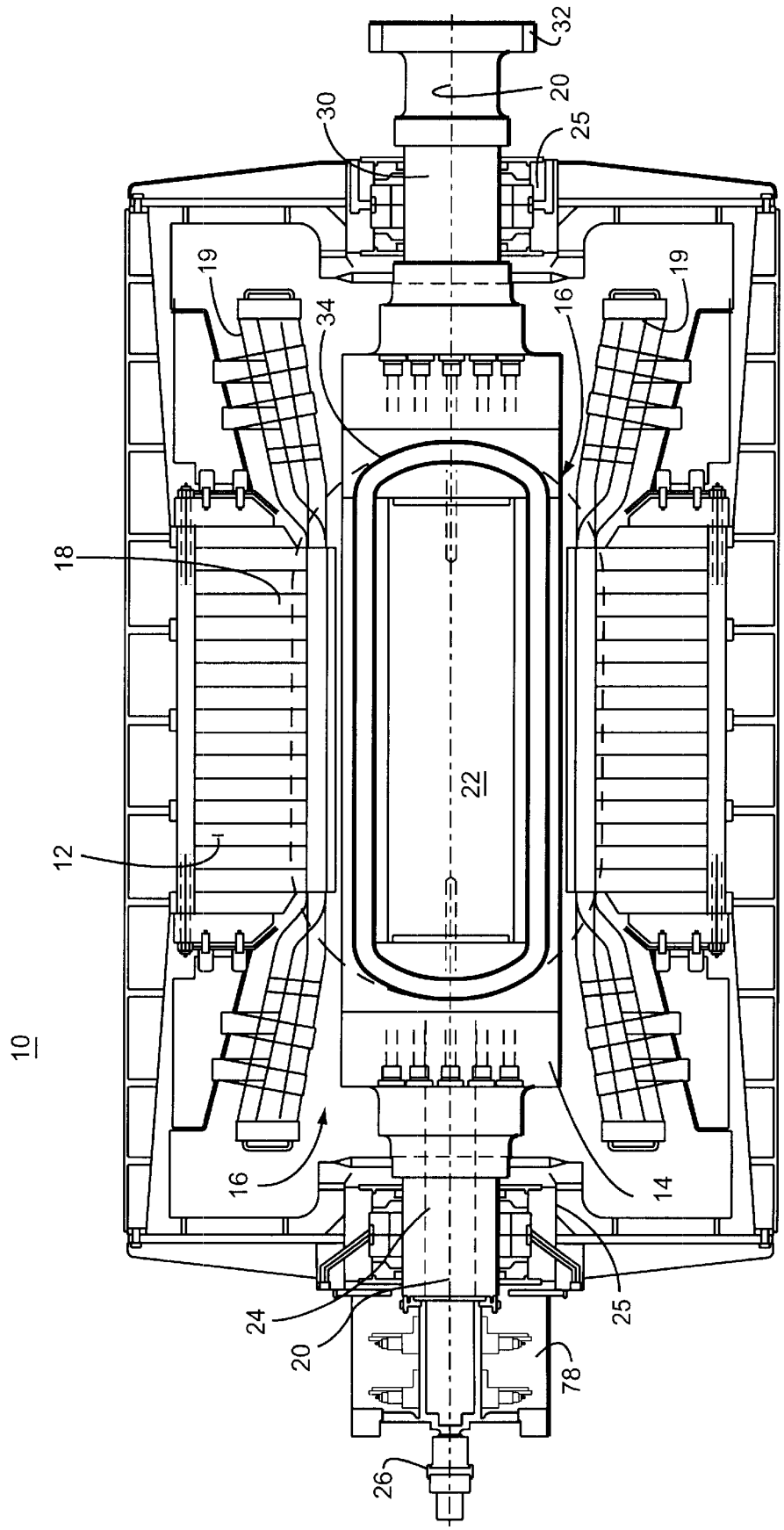
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high-magnetic permeability, and is usually made of a ferromagnetic material, such as iron. In a low-power density super-conducting machine, the iron core of the rotor is used to reduce the magnetomotive force (MMF), and, thus, minimize the amount of super-conducting (SC) coil wire needed for the coil winding. For example, the solid iron-rotor core may be magnetically saturated at an air-gap magnetic field strength of about 2 Tesla.

Figure 2:
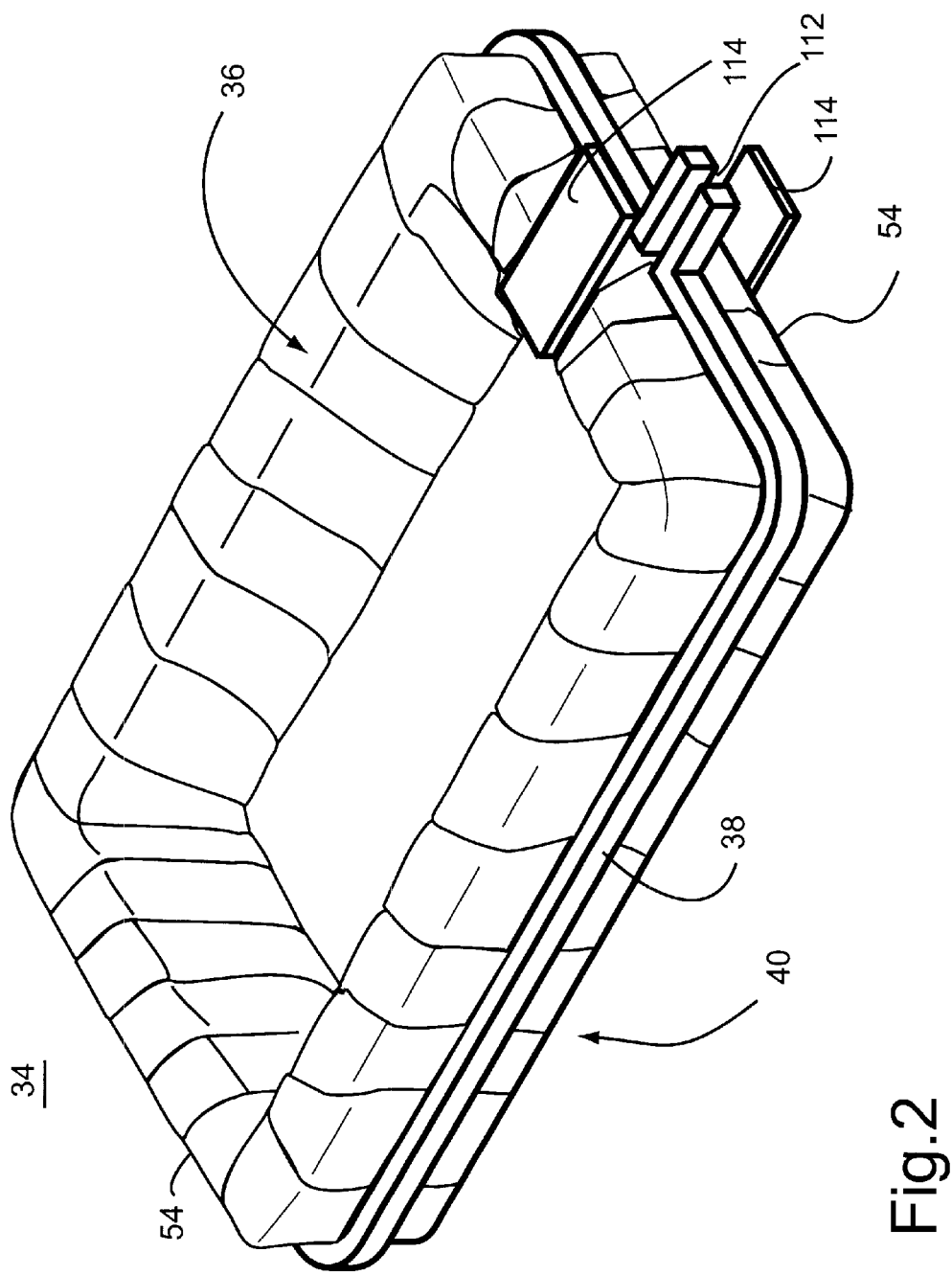
FIG. 2 is a perspective view of an exemplary race-track, super-conducting coil winding.

The rotor 14 supports at least one longitudinally-extending, race-track-shaped, high-temperature superconducting (HTS) coil winding 34 (See FIG. 2). The HTS coil winding may be alternatively a saddle-shape or have some other shape that is suitable for a particular HTS rotor design. A coil support system is disclosed here for a race-track SC coil winding. The coil support system may be adapted for coil configurations other than a race-track coil mounted on a solid rotor core.

The rotor includes a collector end shaft 24 and a drive end shaft 30 that both bracket the rotor core 22 and are supported by bearings 25. The collector end shaft includes collector rings 78 for electrically connecting to the rotating SC coil winding. The collector end shaft 24 also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 may be driven by a power turbine via drive coupling 32.

FIG. 2 shows an exemplary HTS race-track field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the race-track SC coil 36.

The dimensions of the race-track coil are dependent on the dimensions of the rotor core. Generally, each race-track SC coil encircles the magnetic poles of the rotor core, and is parallel to the rotor axis. The coil windings are continuous around the race-track. The SC coils form a resistance-free electrical current path around the rotor core and between the magnetic poles of the core. The coil has electrical contacts 114 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K, in the SC coil winding needed to promote superconducting conditions, including the absence of electrical resistance in the coil. The cooling passages have an input and output fluid ports 112 at one end of the rotor core. These fluid (gas) ports 112 connect the cooling passages 38 on the SC coil to the cryogen transfer coupling 26.

Each HTS race-track coil winding 34 has a pair of generally-straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
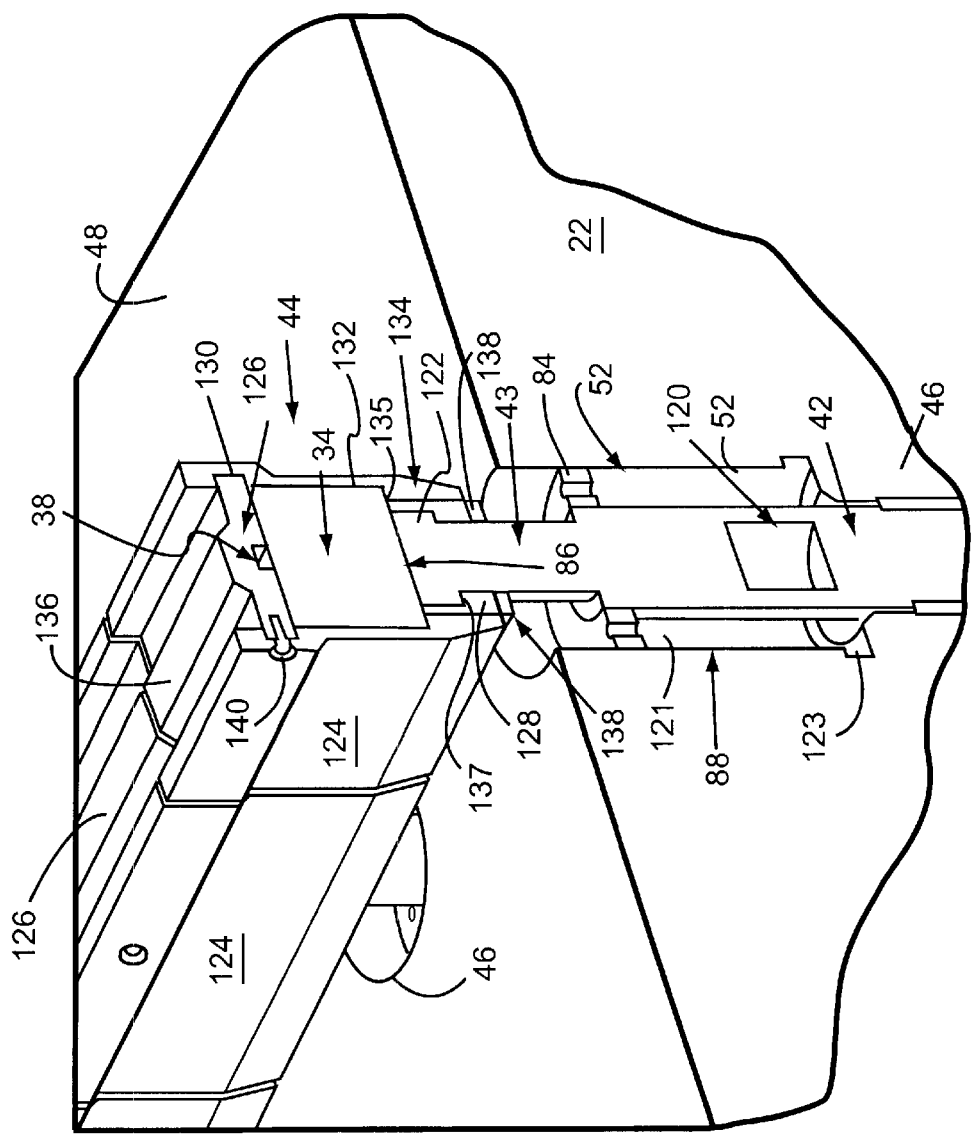
FIG. 3 is a partially cut-away view of the rotor core, coil winding and coil support system for a high temperature super-conducting (HTS) rotor.

FIG. 3 shows a partially cut away view of a rotor core 22 and coil support system for a high temperature superconducting (HTS) coil winding. The coil support systems includes a series of coil support assemblies spanning through the rotor core and between opposite sides of the HTS coil winding. Each coil support assembly comprises a tension rod 42 that extends through the rotor core, tension bolts 43 inserted into the ends of the rod, and channel coil housings 44 fastened to the bolts and that bracket the coil windings. The coil support system provides a structural frame to hold the coil winding in the rotor.

The principal loading of the HTS coil winding 34 is from centrifugal acceleration during rotor rotation. The coil support assemblies are each aligned with the centrifugal loading of the coil to provide effective structural support to the coil winding under load. To support the side sections of the coil, each assembly of a tension rod 42 and bolts 43 (tension rod assembly) spans between the coils, and attaches to the channel coil housings 44. The housings grasp opposite side sections of the coil. The tension rods 42 extend through a series of conduits 46 in the rotor core. These rods are aligned with the quadrature axis of the rotor core.

The channel coil housings 44 support the coil winding 34 against centrifugal forces and tangential torque forces. Centrifugal forces arise due to the rotation of the rotor. Tangential forces may arise from acceleration and deceleration of the rotor, and torque transmission. Because the long sides 40 of the coil winding are encased by the channel housings 44 and the ends 86 of the tension bolts, the sides of the coil winding are fully supported within the rotor.

The conduits 46 are generally cylindrical passages in the rotor core having a straight axis. The diameter of the conduits is substantially constant. However, the ends 88 of the conduits may expand to a larger diameter to accommodate an insulating tube 52. This tube aligns the rod 42 in the conduit and provides thermal isolation between the rotor core and the rod. The insulating tube has a lower outer ring 123 that engages the walls of the wide diameter end 88 of the rotor conduits 46. The cylindrical side wall 121 of the insulating tube 52 extends up from the outer ring 123, and is not in contact with the walls of the conduit. The upper end of the tube engages a lock-nut 84 that connects the tube to the tension rod 42. Thus, the insulating tube and lock-nut provide a non-thermally conducting mount for the tension rod in the conduits 46 of the rotor core.

The number of conduits 46 and their location on the rotor core depends on the location of the HTS coils and the number of coil housings needed to support the side sections of the coils. The axes of the conduits 46 are generally in a plane defined by the race-track coil 34. In addition, the axes of the conduits are perpendicular to the side sections of the coil. Moreover, the conduits are orthogonal to and intersect the rotor axis, in the embodiment shown here. The number of conduits and the location of the conduits will depend on the location of the HTS coils and the number of coil housings needed to support the side sections of the coils.

There are generally two categories of support for superconducting winding: (i) "warm" supports and (ii) "cold" supports. In a warm support, the supporting structures are thermally isolated from the cooled SC windings. With warm coil supports, most of the mechanical load of a superconducting (SC) coil is supported by structural members that span between the cold coils and the warm support members.

In a cold coil support system, the support system is at or near the cold cryogenic temperature of the SC coils. In cold supports, most of the mechanical load of a SC coil is supported by the coil support structural members which are at or near cryogenic temperature.

The exemplary coil support system disclosed here is a cold support in that the tension rods 42, bolts 43 and associated channel housings 44 are maintained at or near a cryogenic temperature. Because the coil support members are cold, these members are thermally isolated, e.g., by the non-contact conduits through the rotor core, from the rotor core and other "hot" components of the rotor.

The HTS coil winding and structural coil support components are all at cryogenic temperature. In contrast, the rotor core is at an ambient "hot" temperature. The coil supports are potential sources of thermal conduction that would allow heat to reach the HTS coils from the rotor core. The rotor core becomes hot during operation. As the coil windings are to be held in super-cooled conditions, heat conduction into the coils from core is to be avoided.

The coil support system is thermally isolated from the rotor core. For example, the tension rods and bolts are not in direct contact with the rotor. This lack of contact avoids the conduction of heat from the rotor to the tension rods and coils. In addition, the mass of the coil support system structure has been minimized to reduce the thermal conduction through the support assemblies into the coil windings from the rotor core.

Each tension rod 42 is a shaft with continuity along the longitudinal direction of the rod and in the plane of the race-track coil. The tension rod is typically made of high strength non-magnetic alloys such as titanium, aluminum or an Inconel alloy. The longitudinal continuity of the tension rods provides lateral stiffness to the coils which provides rotor dynamics benefits. Moreover, the lateral stiffness of the tension rods 42 permits integrating the coil support with the coils so that the coil can be assembled with the coil support on the rotor core prior to final rotor assembly.

The tension bolts 43 screw into threaded holes 120 in the end of the tension rod. The depth to which the bolt screws into the rod is adjustable. The total length of the tension rod and bolt assembly (which assembly spans between the sides of the coil) can be changed by turning one or both of the bolts into or out of the holes of the tension rods. This adjustment in the length of the tension rod and bolts assembly is useful in fitting this assembly between the sides of a coil winding. The depth of the threaded hole in the end of the tension rod is sufficient to provide adequate adjustment of the length of the tension rod and bolts assembly.

The head 122 of the bolt includes a flange with a flat outer surface 86. The flat head 86 of the bolt abuts an inside surface of the coil winding 34 and, thus, supports the load on the coil winding that is parallel to the tension rod.

The flat surface 86 of the bolt head supports an inside surface of a side of the coil winding. The other three surfaces of the side 40 of the coil winding are supported by the channel housing 44. Each coil channel housing is assembled around the coil and forms a coil casing in cooperation with the bolt head. This casing supports the coil winding with respect to tangential and centrifugal loads. The casing also allows the coil winding to expand and contract longitudinally.

Each channel housing 44 has a pair of side panels 124, a wedge 126 and a threaded insert sleeve 128. The side panels bracket opposite surfaces of the coil. An inside surface of each side panel has a narrow slot 130 to receive the wedge and an "L" shaped surface 132 to receive a side surface of the coil winding. The inside surface of each side panel also has a threaded flange 134 that includes a lip 135 of the L-surface 132 to engage a corner of the coil winding. The threaded section of the flange engage a threaded insert 128 that fits between the flange sections 134 of the opposite side panels 124. The insert has an aperture 137 with a rim to receive the tension bolt 43. A lock-nut 138 holds the insert 128 securely against the bolt head 43.

The wedge 126 fits into the narrow slot 130 of each side panel and spans between the side panels. The wedge abuts an outside surface of the coil and has a channel 136 to receive the cooling passage 38 on the outside surface of the coil. Locking screws 140 hold the side panels to the wedge. The side panels are held together by the wedge and grasp the treaded insert which is secured to the bolt head. The channel housing may be made of light, high strength material that is ductile at cryogenic temperatures. Typical materials for the channel housings are aluminum and titanium alloys. The shape of the channel housing has been optimized for low weight.

Figure 4:
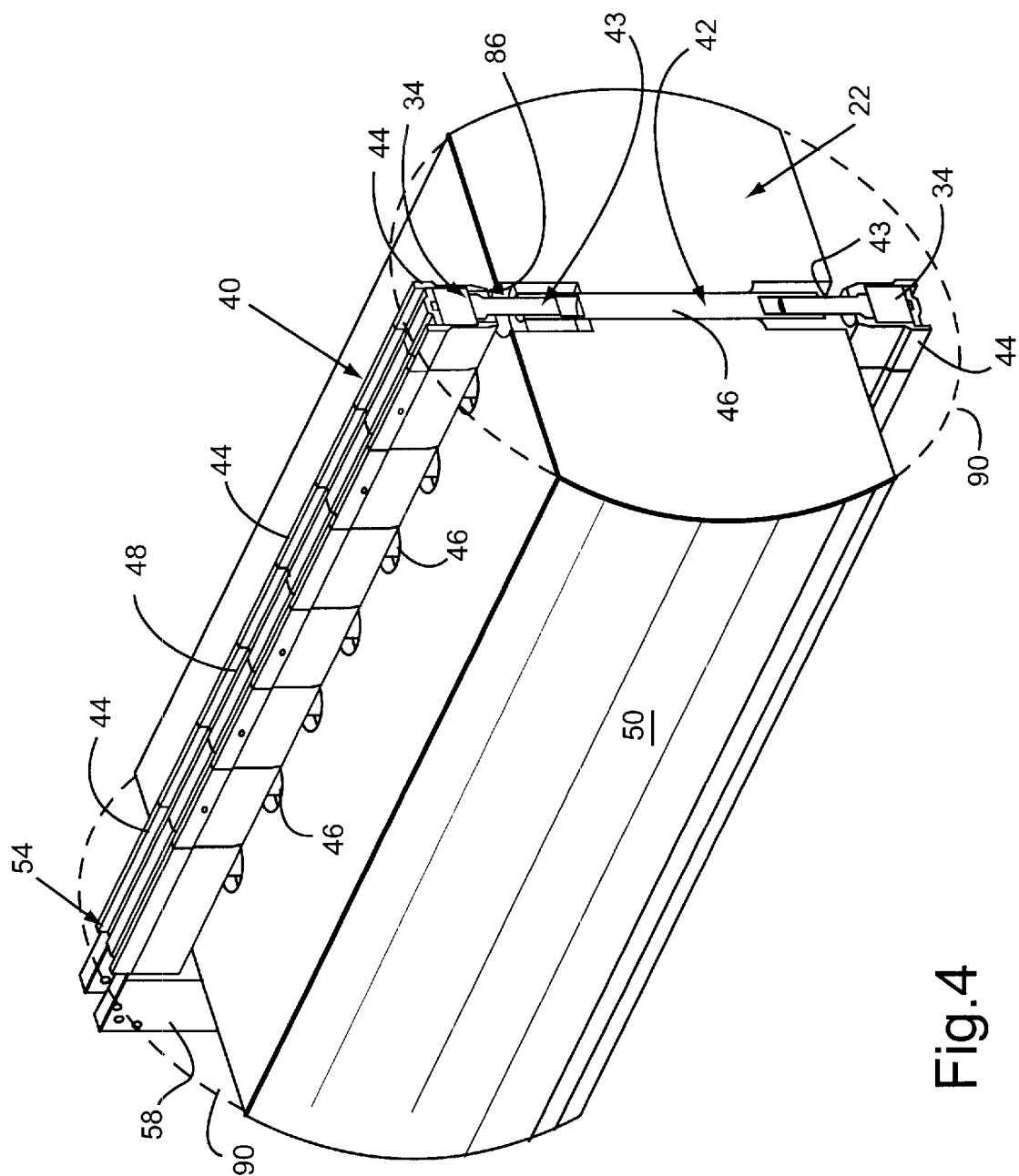
FIG. 4 is a perspective view of the rotor core, coil winding and coil support system for a high temperature super-conducting (HTS) rotor.

As shown in FIG. 4, a series of channel coil housings 44 (and associated tension bolts 43 and rods 44) may be positioned along the sides 40 of the coil winding. The channel housings collectively distribute the forces that act on the coil, e.g., centrifugal forces, over substantially the entire side sections 40 of the coil. The channel housings 44 prevent the coil side sections 40 from excessive flexing and bending due to centrifugal forces.

The plurality of channel housings 44 effectively hold the coil in place without affectation by centrifugal forces. Although the channel housings are shown as having a close proximity to one another, the housings need only be as close as necessary to prevent degradation of the coil caused by high bending and tensile strains during centrifugal loading, torque transmission, and transient fault conditions.

The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The coil support system of tension rods 42, bolts 43 and channel housings 44 may be assembled with the HTS coil windings 34 as they are mounted on the rotor core 22. The tension rods and channel housings provide a fairly rigid structure for supporting the coil winding and holding the long sides of the coil winding in place with respect to the rotor core. The ends of the coil may be supported by split clamps 58 at the axial ends of (but not in contact with) the rotor core 22.

The iron rotor core 22 has a generally cylindrical shape suitable for rotation within the rotor cavity 16 of the stator 12. To receive the coil winding, the rotor core has recessed surfaces 48, such as flat or triangular regions or slots. These surfaces 48 are formed in the curved surface of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer-surface of the coil winding extends to substantially an envelope defined by the rotation of the rotor. The outer, curved surfaces 50 of the rotor core when rotated define a cylindrical envelope. This rotation envelope of the rotor has substantially the same diameter as the vacuum rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

At the end of each tension rod, there may be an insulating tube 52 that fastens the coil support structure to the hot rotor and prevents heat convection therebetween. Additionally, there may an insulating lock-nut 84 connected to the insulating tube 52, and that further facilitates the connection between the tension rod and the housing. The lock-nut 84 and the tube 52 secure the tension rod and channel housing to the rotor core while minimizing the heat transfer from the hot rotor to the housing structure.

The rotor core, coil windings and coil support assemblies are pre-assembled. Pre-assembly of the coil and coil support reduces production cycle, improves coil support quality, and reduces coil assembly variations. Before the rotor core is assembled with the rotor end shafts and other components of the rotor, the tension rods 42 are inserted into each of the conduits 46 that extend through the rotor core. The insulator tube 52 at each end of each tension rod is placed in the expanded end 88 at each end of the conduits 46. The tube 52 is locked in place by a retainer locking-nut 84.

The bolts 43 may be inserted before or after the tension rods are inserted into the rotor core conduits. The treaded inserts 128 and locking nut 138 are placed on the bolts 43 before the bolts are placed in the tension rods. However, the lock-nut is not tightened against the insert until after the channel housing 44 is assembled.

The depth to which the bolts are screwed into the tension rods is selected such that the length from the end of one bolt on a tension rod to the end of the opposite bolt clears the distance between the assembly of channel housings over the long sides 40 of the coil winding. When the tension rods and bolts are assembled in the rotor core 22, the coil winding 34 is ready to be inserted onto the core.

The channel housings 44 are assembled over the winding 34. The lock screws are inserted to hold the wedges and the side panels together. Then the subassembly of coil winding and channel housings is inserted onto the rotor core over the ends of the tension rods 42. The cylindrical threaded insert 128 is screwed or otherwise inserted between the side panels so that the flat end of the bolt head abut the inside surface of the side sections 40 of the winding. The lock-nut 138 is used to tighten the threaded insert against the bolt.

The rotor core may be encased in a metallic cylindrical shield 90 (shown by dotted lines) that protects the superconducting coil winding 34 from eddy currents and other electrical currents that surround the rotor and provides a vacuum envelope to maintain a hard vacuum around the cryogenic components of the rotor. The cylindrical shield 90 may be formed of a highly-conductive material, such as a copper alloy or aluminum.

The SC coil winding 34 is maintained in a vacuum. The vacuum may be formed by the shield 90 which may include a stainless steel cylindrical layer that forms a vacuum vessel around the coil and rotor core.

The coil channel housings, tension rods and bolts (coil support assembly) may be assembled with the coil winding before the rotor core and coils are assembled with the collar and other components of the rotor. Accordingly, the rotor core, coil winding and coil support system can be assembled as a unit before assembly of the other components of the rotor and of the synchronous machine.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A method for supporting a super-conducting coil winding in the rotor core of a synchronous machine comprising the steps of:
   a. extending a tension rod through a conduit in said rotor core, wherein said tension rod extends through the rotor from one side of the rotor to another side, is perpendicular to an axis of the rotor and is thermally isolated from the conduit;
   b. inserting at least one tension bolt into an end of the rod;
   c. assembling at least one housing around one of the side sections of the coil winding;
   d. positioning the coil winding with housing around the rotor core such that the tension rod and tension bolt span between side sections of the coil winding with housing and the end of the rod is adjacent one of said side sections of the coil, and
   e. securing the bolt to one of the housings.

2. A method as in claim 1 further comprising inserting a second bolt into a second end of the rod and securing the second bolt to a second housing attached to a second side section of the coil winding such that the second end of the tension rod and second bolt are adjacent the second side section of the coil.

3. A method as in claim 1, further comprising inserting a second housing over a second side section of the coil and attaching the second housing to a second bolt at a second end of the tension rod, wherein said tension rod extends through a rotational axis of the rotor core, and the first side and second side of the coil are on opposite sides of the rotor.

4. A method as in claim 1 further comprising securing the bolt to the housing by a threaded insert.

5. A method as in claim 1 further comprising cryogenically cooling the coil, said housing, the tension bolt and the tension rod.

6. A method as in claim 1 wherein several tension rods and bolts are inserted into a series of conduits in the rotor core and secured to the coil winding.

7. A method as in claim 1 further comprising the step of changing a depth of the bolt in the tension rod to adjust a length of an assembly of the tension rod and the bolt.

* * * * *